United States Patent [19]

Wu et al.

[11] Patent Number: 5,807,912
[45] Date of Patent: Sep. 15, 1998

[54] ORTHO ESTERS AS BPA SCAVENGER IN POLYCARBONATE PRODUCT

[75] Inventors: Pin-pin Wu, Evanville, Ind.; Farid F. Khouri, Clifton Park, N.Y.

[73] Assignee: General Electric Company, Pittsfield, Mass.

[21] Appl. No.: 792,550

[22] Filed: Jan. 31, 1997

Related U.S. Application Data

[63] Continuation-in-part of Ser. No. 724,987, Oct. 3, 1996, abandoned.

[51] Int. Cl.$^6$ ................................. C08K 5/06; C08L 69/00
[52] U.S. Cl. ........................ 524/108; 524/369; 524/375; 524/378; 528/494
[58] Field of Search ............................ 528/494; 524/108, 524/369, 375, 378

[56] References Cited

U.S. PATENT DOCUMENTS

| | | |
|---|---|---|
| 3,028,365 | 4/1962 | Schnell . |
| 3,030,331 | 4/1962 | Goldberg . |
| 3,169,121 | 2/1965 | Goldberg . |
| 3,213,060 | 10/1965 | Jackson .................................... 528/494 |
| 3,275,601 | 9/1966 | Schnell . |
| 3,334,154 | 8/1967 | Kim . |
| 3,644,276 | 2/1972 | Wood ....................................... 524/108 |
| 3,897,392 | 7/1975 | Haupt . |
| 3,915,926 | 10/1975 | Wambach . |
| 4,188,314 | 2/1980 | Fox et al. . |
| 5,086,097 | 2/1992 | Jorissen ..................................... 524/91 |
| 5,391,616 | 2/1995 | Khouri ....................................... 525/67 |

*Primary Examiner*—David Buttner

[57] ABSTRACT

Polycarbonate resins are freed of unreacted residues of the dihydric phenol reactants employed in their preparation by heating the resins in the presence of ortho esters or ortho carbonates.

14 Claims, No Drawings

ORTHO ESTERS AS BPA SCAVENGER IN POLYCARBONATE PRODUCT

CROSS-REFERENCE TO RELATED APPLICATION

This is a continuation-in-part of application(s) Ser. No. 08/724,987 filed on Oct. 3, 1996 now abandoned.

BACKGROUND OF THE INVENTION

1. Field of the Invention

The invention relates to thermoplastic resin compositions and more particularly relates to improved, polycarbonate resins and articles molded therefrom.

2. Brief Description of Related Art

Polycarbonate and copolyester-carbonates are well known resins, commercially available. Methods of preparing polycarbonates by interfacial polymer-ization are also well known; see for example the details provided in the U.S. Pat. Nos. 3,028,365; 3,334,154; 3,275,601; 3,915,926; 3,030,331; 3,169,121; and 4,188,314, all of which are incorporated herein by reference thereto.

Polycarbonate and copolyester-carbonate resins prepared by the interfacial polymerization techniques may contain unreacted residues of the dihydric phenol monomer reactants employed in the preparative polymerization. The unreacted monomer residues in the polymer product may be relatively small amounts, for example about 50 ppm or less. However, even trace amounts of the dihydric phenol reactant residues may have long-term adverse effects on the resin products in terms of stability, color and application uses.

The present invention provides a method of chemically binding unreacted dihydric phenol reactants, residues of interfacial polymerization to obtain polycarbonate and polyester-carbonate resins free of the dihydric phenol residues. The resins, free of the unreacted dihydric phenol reactant, exhibit improved stability. The method converts the contaminant residues of dihydric phenol to inert molecules which do not adversely affect product resin properties.

SUMMARY OF THE INVENTION

The invention comprises a process for treating polycarbonate resins to remove residues of unreacted dihydric phenol reactant employed as monomer reactant in the preparative polymerization, which comprises; heating the resin in the presence of an ortho ester or an ortho carbonate.

DETAILED DESCRIPTION OF THE PREFERRED EMBODIMENTS OF THE INVENTION

In general, the method of polycarbonate resin preparation by interfacial polymerization comprises the reaction of a dihydric phenol with a carbonyl halide (the carbonate precursor).

Although the reaction conditions of the polycarbonate preparative processes may vary, several of the preferred processes typically involve dissolving or dispersing a diphenol reactant in aqueous caustic, adding the resulting mixture to a suitable water immiscible solvent medium and contacting the reactants with a carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins comprises a phosgenation reaction. The temperature at which the phosgenation reaction proceeds may vary from below 0° C., to above 100° C.

The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenols.

The dihydric phenols employed are known, and the reactive groups are the two phenolic hydroxyl groups. Some of the dihydric phenols are represented by the general formula:

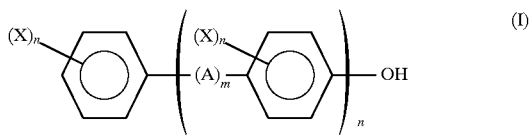

(I)

wherein A is a divalent hydrocarbon radical containing from 1 to about 15 carbon atoms; a substituted divalent hydrocarbon radical containing from 1 to about 15 carbon atoms and substituent groups such as halogen; —S—; —SS—, —S(O)—; —S(O)$_2$—; —O—: or —C—; each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and m is zero or 1 and n is an integer of from 0 to 4.

Typical of some of the dihydric phenols employed are bis-phenols such as bis(4-hydroxy-phenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxy-diphenyls such as p,p'-dihydroxydiphenyl, 3,3'-dichloro-4,4'dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishalo-formate. The carbonyl halides include carbonyl bromide, carbonyl chloride, and mixtures thereof. The bishaloformates include the bishaloformates of dihydric phenols such as bischloroformates of 2,2-bis(4-hydroxyphenyl) propane, 2,2-bis(4-hydroxy-3,5-dichlorophenyl) propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of polycarbon-ates are the high molecular weight thermoplastic randomly branched polycarbonates. These randomly branched polycarbonates are prepared by co-reacting a polyfunctional organic compound with the afore-described dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, halo-formyls or mixtures thereof. Some non-limiting examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri (4-hydroxyphenyl)ethane, trimellitic anhydride or trimellitic acid or their haloformyl derivatives. Also included herein are blends of a linear polycarbonate and a branched polycarbonate.

The polycarbonate resin treated in the process of the invention may be of relatively low weight average molecular weight or of relatively high weight average molecular weight ($M_w$). The lower $M_w$ resins are generally end-capped polycarbonates.

The so-called "end-capped" polycarbonates are prepared by the above-described procedures of producing aromatic carbonate polymers, wherein the reaction mixture includes small amounts of molecular weight regulators or chain terminators to provide end or terminal groups on the carbonate polymer and thereby control the molecular weight of the polycarbonate.

A molecular weight regulator, i.e.; a chain stopper, is generally added to the reactants prior to or during the contacting of them with the carbonate precursor. Useful molecular weight regulators include, but are not limited to, monohydric phenols such as phenol, chroman-I, paratertiarybutylphenol, p-cumylphenol and the like.

Other compounds that act as chain terminators for the carbonate polymers are also known. Thus, U.S. Pat. No. 3,085,992 discloses alkanol amines as chain terminators; U.S. Pat. No. 3,399,172 teaches imides as chain terminators; U.S. Pat. No. 3,275,601 discloses that aniline and methyl aniline function as chain terminators in the interfacial polymerization process for producing polycarbonates; and U.S. Pat. No. 4,011,184 discloses primary and secondary amines as molecular weight regulators for polycarbonate.

Furthermore, U.S. Pat. No. 3,028,365 discloses that aromatic amines and other monofunctional compounds can be used to control or regulate the molecular weight of the polycarbonates, thereby forming aryl carbamate terminal groups. Aromatic polycarbonates having carbamate end groups are disclosed in U.S. Pat. No. 4,111,910. These polycarbonates are prepared using a terminating amount of ammonia, ammonium compounds, primary cycloalkyl, aliphatic or aralkyl amines and secondary cycloalkyl, alkyl or aralkyl amines.

The aromatic carbonate polymers treated by the process of the invention include polyestercarbonates, also known as copolyester-polycarbonates, i.e., resins which contain, in addition to recurring polycarbonate chain units of the formula:

wherein D is a divalent aromatic radical of the dihydric phenol employed in the polymerization reaction, repeating or recurring carboxylate units, for example of the formula:

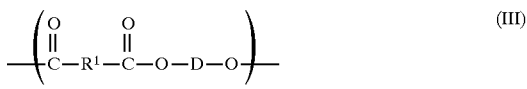

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$\text{HOOC}-R^1-\text{COOH} \qquad \qquad \text{(IV)}$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

$$-\text{E}-$$

wherein E is a divalent alkylene or alkylidene group. E may also consist of two or more alkylene or alkylidene groups, connected by a non-alkylene or alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids of the formula (IV), $R^1$ is an aromatic radical such as phenylene, biphenylene, naphthylene, or substituted phenylene. Some non-limiting examples of aromatic dicarboxylic acids which may be used in preparing the poly(estercarbonate) resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with an inorganic atom such as chlorine, bromine, fluorine and the like; an organic group such as the nitro group; an organic group such as alkyl; or an oxy group such as alkoxy, it being only necessary that the group be inert to and unaffected by the reactants and the reaction conditions. Particularly useful aromatic dicarboxylic acids are those represented by the general formula:

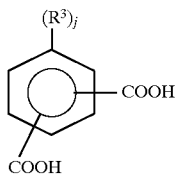 (V)

wherein j is a positive whole integer having a value of from 0 to 4 inclusive; and each $R^3$ is independently selected from the group consisting of alkyl radicals, preferably lower alkyl (1 to about 6 carbon atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acid, and mixtures thereof.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins will vary in accordance with the proposed use of the blends of the invention containing this product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The polycarbonate resins treated in accordance with the process of the present invention may also comprise blends of the polycarbonate resin with conventional molding aids such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; impact modifiers and color stabilizers such as the organophosphites; thermal stabilizers such as phosphite; mold release agents and flame retardants. Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

The ortho esters and ortho carbonates employed in the process of the invention to remove unreacted dihydric phenol reactants such as those of the formula (I) given above are a well known class of organic compounds as are the methods for their preparation. Representative of ortho esters and ortho carbonates are acyclic compounds of the formula:

 (VI)

wherein $R^1$, $R^2$, $R^3$ and $R^4$ are each independently alkyl, aryl or aralkyl and p is O (an ortho ester) or 1 (an ortho carbonate). Also representative are the cyclic ortho esters and ortho carbonates of the formula:

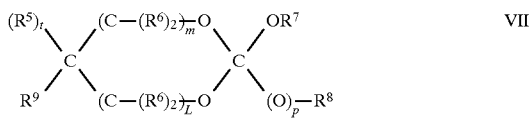 VII wherein $R^5$, $R^7$ and $R^8$ are each independently selected from the group consisting of hydrogen, alkyl and aryl; or $R^7$ and $R^8$ together with the carbon atom to which they are attached form a 4 to 8 carbon membered ring; each $R^6$ is a divalent alkylene or arylene moiety; $R^9$ represents hydrogen, halogen, lower alkyl of 1 to 5 carbon atoms, substituted or unsubstituted aryl; L is 0 or 1, n is an integer of from 0 to 2, p is 0 or 1 and t is 1, except it is 0 when the carbon to which $R^5$ is attached and $R^7$ form another ring.

Representative of ortho esters are methyl orthopropionate, methyl orthoisobutyrate, ethyl orthoformate, ethyl orthopropionate, trimethyl orthobenzoate and the like. The ortho esters may be prepared by well known methods such as, for example, the reaction of the corresponding trihalides with sodium alkoxides; Soh and Ma, J. Am. Chem. Soc. 54,2964 (1932). Representative of ortho carbonates is 2-methoxy-2-phenyl-1,3-diorolane. Also included as useful ortho esters and ortho carbonates are polymeric and oligomeric compounds which contain terminal ortho ester and ortho carbonate functional groups, such as those described for example in U.S. Pat. Nos. 5,212,255 and 5,391,616, both of which are incorporated herein by reference thereto.

The process of the present invention may be carried out by mixing a proportion (about 25 ppm to about 500) of the ortho ester with the polycarbonate resin and heating the mixture. Although the inventors are not to be bound by any theory of operation, the resulting reaction may be between the phenyl hydroxyl groups of the dihydric phenol (I) residues and the ortho esters. In any event, the residue dihydric phenols are removed as active hydroxy compounds.

Heating promotes the desired reaction, and advantageously the mixture of polycarbonate resin and ortho ester are heated to a temperature within the range of from about 280° C. to about 380° C. at ambient atmospheric pressures for a period of time sufficient to achieve reaction. Generally, 15 to 30 minutes is a sufficient period of time.

The process of the invention is advantageously carried out by mixing and heating the mixture of polycarbonate resin by melt blending technique. Thus, preferably the resin compositions of the invention are prepared by homogeneously blending the polycarbonate and the ortho ester. The blending may be carried out by use of conventional and known techniques and apparatus for the blending together of synthetic polymeric resin components. In general, the mixtures of components may be blended by pre-mixing in conventional mixing rolls, dough mixers, Banbury mixers and the like and by blending the pre-mix in an extruder or fluxing it on a mill at an elevated temperature sufficient to achieve a homogenous blending. Upon cooling, the blend may be pelletized and stored for molding into articles.

Advantageously, the melt blending is carried out in the presence of a catalytic proportion of a catalyst to promote the reaction. A catalytic proportion is generally one within the range of from about 0.00001 to 0.01 parts by weight of the resin composition. Useful catalysts are basic catalysts. Representative of such catalysts are oxides, hydrides, hydroxides or amides of alkali or alkaline earth metals such as, for example, lithium hydroxide and the like. Also, basic metal oxides such as zinc oxide, and the like. Also representative of useful catalysts are salts of weak acids such as lithium stearate; organo-titanium catalysts such as tetraoctyl-titanate; organotin catalysts such as dibutyltin oxide; aluminum or boron anion containing catalysts such as those described in U.S. Pat. Nos. 4,330,669 and 4,395,062 and the like.

Preferred as a catalyst is tetrabutylammonium tetraphenylborate.

The following examples describe the manner and process of making and using the invention and set forth the best mode contemplated by the inventors for carrying out the invention but are not to be construed as limiting the scope of the invention. All parts are by weight

EXAMPLES 1–3

Polycarbonate resin powder made by homogeneously mixing 70 percent by weight of a branched polycarbonate resin (Lexan®, General Electric Co.) having an $M_w$ of 37,500, with 30 percent by weight of a linear polycarbonate resin ($M_w$ 21,500) was blended with various amounts of orthoester and, at times, with a trans-esterification catalyst. The Mixture was melt blended and extruded into plastic pellets. The melt was extruded after mixing for about 20 minutes at a temperature of circa 320° C. The plastic pellets were tested for free bisphenol A (BPA) content in the extruded plastic pellets.

EXAMPLE 1

| Sample (polycarbonate) | Free (BPA content) |
| --- | --- |
| pellets from powder mixture (untreated) | 9.8 ppm |
| pellets from powder treated with 0.03% trimethyl orthobenzoate pellets from powder treated with 0.03% trimethyl orthobenzoate and 0.004% tetrabutylammonium tetraphenylborate | 1.8 ppm less than 1 ppm |

EXAMPLE 2

| Sample (polycarbonate) | Free (BPA content) |
| --- | --- |
| pellets from powder mixture (untreated) | 9.8 ppm |
| pellets from powder treated with 0.01% trimethyl orthobenzoate | less than 1 ppm |
| pellets from powder treated with 0.02% trimethyl orthobenzoate | 2.1 ppm |
| pellets from powder treated with 0.03% trimethyl orthobenzoate | 1.7 ppm |
| pellets from powder treated with 0.03% 2-methoxy-2-phenyl-1,3 dioxolane | 1.7 ppm |

EXAMPLE 3

| Sample (polycarbonate) | Free (BPA content) |
| --- | --- |
| pellets from powder mixture (untreated) | 16 ppm |
| pellets from powder treated with 0.0025% trimethyl | 16 ppm |

-continued

| Sample (polycarbonate) | Free (BPA content) |
| --- | --- |
| orthobenzoate pellets from powder treated with 0.05% trimethyl orthobenzoate | 5.0 ppm |
| pellets from powder treated with 0.075% trimethyl orthobenzoate | 1.0 ppm |

What is claimed is:

1. A process for treating polycarbonate resins to remove residues of unreacted dihydric phenol reactant employed as a monomer reactant in the preperative polymerization, which comprises; heating the resin in the presence of an ortho ester or ortho carbonate, wherein the ortho ester or ortho carbonate is: (1) an acyclic compound of the formula:

(VI)

wherein $R^1, R^2, R^3$, and $R^4$ are each independently alkyl, aryl or aralkyl and p is 0 (an ortho ester) or p is 1 (an ortho carbonate); or (2) a cyclic compound of the formula:

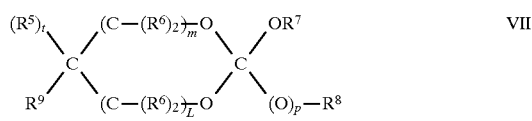

VII wherein $R^5$, $R^7$ and $R^8$ are each independently selected from the group consisting of hydrogen, alkyl and aryl; $R^6$ is selected from the group consisting of primary alkyl of 1 to 10 carbon atoms, inclusive, secondary alkyl of 1 to 10 carbon atoms, inclusive, aralkyl of 1 to 10 carbon atoms, inclusive, an aromatic radical of 6 to 10 carbon atoms, inclusive, or an alkylene radical forming a 4 to 8 carbon membered ring with the carbon to which it is attached, thus producing a bicyclic compound (VII); or $R^7$ and $R^8$ together with the carbon atom to which they are attached form a 4 to 8 carbon membered ring; each $R^6$ is a divalent alkylene or arylene moiety; $R^9$ represents hydrogen, halogen, lower alkyl of 1 to 5 carbon atoms, substituted or unsubstituted aryl; L is 0 or 1, m is an integer of from 0 to 2, p is 0 or 1 and t is 1, except t is 0 when the carbon to which $R^5$ is attached and $R^7$ form another ring.

2. The process of claim 1 wherein the dihydric phenol is of the formula:

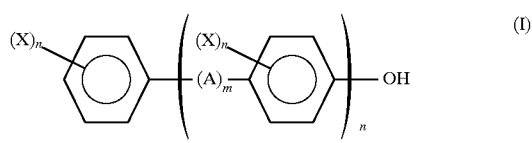

(I)

wherein A is a divalent hydrocarbon radical containing from 1 to about 15 carbon atoms; a substituted divalent hydrocarbon radical containing from 1 to about 15 carbon atoms with substituent groups of halogen; —S—; —SS—; —S(O)—; —S(O)$_2$—; —O—: or —C—; each X is independently selected from the group consisting of hydrogen, halogen, and a monovalent hydrocarbon radical, an aryl group of from 6-carbon 18 atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and m is zero or 1 and n is an integer of from 0 to 4.

3. The process of claim 2 wherein the dihydric phenol is bisphenol A.

4. The process of claim 1 wherein the polycarbonate resin is a branched polycarbonate resin.

5. The process of claim 1 wherein the polycarbonate resin is a linear polycarbonate resin.

6. The process of claim 1 wherein the polycarbonate is a polyester-carbonate resin.

7. The product of the process of claim 1.

8. The process of claim 1 wherein the ortho ester is trimethyl orthobenzoate.

9. The process of claim 1 wherein heating is carried out by melt blending the ortho ester or ortho carbonate with polycarbonate.

10. The process of claim 1 wherein the ortho carbonate is 2-methoxy-2-phenyl-1,3-dioxolane.

11. The process of claim 1 wherein heating is at a temperature within the range of from about 280° C. to about 380° C.

12. The process of claim 1 wherein heating is carried out in the presence of a catalyst.

13. The process of claim 12 wherein the catalyst is tetrabutylammonium tetraphenylborate.

14. A process for removing contaminant dihydric phenol from a polycarbonate resin, which comprises;

melt blending the resin with from 25 to 500 ppm of an ortho ester or ortho carbonate in the presence of a catalyst, wherein the ortho ester or ortho carbonate is:
(1) an acyclic compound of the formula:

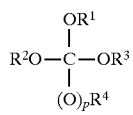

(VI)

wherein $R^1, R^2, R^3$, and $R^4$ are each independently alkyl, aryl or aralkyl and p is 0 (an ortho ester) or p is 1 (an ortho carbonate); or (2) a cyclic compound of the formula:

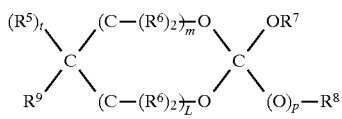

VII wherein $R^5$, $R^7$ and $R^8$ are each independently selected from the group consisting of hydrogen, alkyl and aryl; $R^6$ is selected from the group consisting of primary alkyl of 1 to 10 carbon atoms, inclusive, secondary alkyl of 1 to 10 carbon atoms, inclusive, aralkyl of 1 to 10 carbon atoms, inclusive, an aromatic radical of 6 to 10 carbon atoms, inclusive, or an alkylene radical forming a 4 to 8 carbon membered ring with the carbon to which it is attached, thus producing a bicyclic compound (VII); or $R^7$ and $R^8$ together with the carbon atom to which they are attached form a 4 to 8 carbon membered ring; each $R^6$ is a divalent alkylene or arylene moiety; $R^9$ represents hydrogen, halogen, lower alkyl of 1 to 5 carbon atoms, substituted or unsubstituted aryl; L is 0 or 1, m is an integer of from 0 to 2, p is 0 or 1 and t is 1, except t is 0 when the carbon to which $R^5$ is attached and $R^7$ form another ring.

* * * * *